United States Patent
Weems et al.

(10) Patent No.: US 7,527,176 B2
(45) Date of Patent: May 5, 2009

(54) GREASE GUN WITH REMOTE-FEED ADAPTER

(75) Inventors: R. Mark Weems, Cedar Rapids, IA (US); Don R. Linkletter, Cedar Rapids, IA (US)

(73) Assignee: Weems Industries Inc., Marion, IA (US)

( * ) Notice: Subject to any disclaimer, the term of this patent is extended or adjusted under 35 U.S.C. 154(b) by 26 days.

(21) Appl. No.: 11/585,008

(22) Filed: Oct. 23, 2006

(65) Prior Publication Data

US 2007/0034651 A1    Feb. 15, 2007

Related U.S. Application Data

(63) Continuation-in-part of application No. 11/104,819, filed on Apr. 13, 2005, now Pat. No. 7,469,803.

(60) Provisional application No. 60/562,355, filed on Apr. 15, 2004.

(51) Int. Cl.
*G01F 11/00* (2006.01)
*F01M 11/04* (2006.01)

(52) U.S. Cl. .............. 222/262; 222/383.1; 222/327; 222/309; 184/105.2; 184/28

(58) Field of Classification Search ............... 222/401, 222/402, 256, 74, 527, 327, 383.1, 372, 378, 222/309, 262, 563; 184/105.2, 28, 45.2, 184/38.2, 105.1; 141/21, 25, 26, 27; 251/274, 251/264, 356

See application file for complete search history.

(56) References Cited

U.S. PATENT DOCUMENTS

| | | | | | |
|---|---|---|---|---|---|
| 1,021,681 | A | * | 3/1912 | Jennings | 137/375 |
| 1,463,861 | A | * | 8/1923 | Winkley | 141/382 |
| 1,741,983 | A | * | 12/1929 | Ellberg et al. | 251/367 |
| 1,743,968 | A | * | 1/1930 | Hatfield | 417/401 |
| 1,807,421 | A | * | 5/1931 | Mahoney | 222/261 |
| 1,828,317 | A | * | 10/1931 | Clapp | 222/108 |
| 1,856,372 | A | * | 5/1932 | Buchet | 222/262 |
| 1,969,254 | A | * | 8/1934 | Bizzarri | 222/56 |
| 1,981,825 | A | * | 11/1934 | Miller, Jr. | 137/375 |
| 2,613,055 | A | * | 10/1952 | Slapnicher | 251/264 |
| 2,810,496 | A | * | 10/1957 | Gray | 222/254 |
| 3,829,025 | A | * | 8/1974 | McLeod | 239/373 |
| 4,274,561 | A | * | 6/1981 | Andersson | 222/334 |
| 4,756,481 | A | * | 7/1988 | Leuenberger | 239/332 |
| 4,821,927 | A | * | 4/1989 | Paulsen et al. | 222/263 |
| 5,067,591 | A | * | 11/1991 | Fehlig | 184/55.1 |
| 5,118,073 | A | * | 6/1992 | Hutton | 251/88 |
| 5,474,214 | A | * | 12/1995 | Chung et al. | 222/262 |

* cited by examiner

*Primary Examiner*—Kevin P Shaver
*Assistant Examiner*—Stephanie E Tyler
(74) *Attorney, Agent, or Firm*—Wenzel & Harms, P.C.; Allan L. Harms

(57) ABSTRACT

A portable grease gun with the capability of being attached to either a grease containing barrel or a hose carrying grease from a grease supply container. An adapter may be mounted to the barrel mounting in place of a barrel to couple the grease gun to a hose connected to a grease supply container remote from the grease gun. Alternating plug may be mounted in the barrel mounting and a pumped grease supply coupled to the resupply port on the grease gun. The grease gun includes an output valve which restrains passage of grease at pressure below 30 psi.

3 Claims, 4 Drawing Sheets

GREASE GUN WITH REMOTE-FEED ADAPTER

CROSS-REFERENCE TO RELATED APPLICATIONS

This application claims priority from provisional U.S. patent application Ser. No. 60/562,355 titled Multipressure Portable Grease Gun, filed on Apr. 15, 2004, and is a continuation-in-part of Ser. No. 11/104,819 filed Apr. 13, 2005 now U.S. Pat. No. 7,469,803 titled: Grease Gun with Remote-Feed Adapter. The disclosures of patent application Ser. No. 60/562,355, and Ser. No. 11/104,819 are hereby incorporated in their entireties.

BACKGROUND OF THE INVENTION

Portable grease guns are used throughout industry to provide a supply of pressurized grease to lubricate vehicles and myriad types of machinery. In the typical portable hand held grease gun, a grease gun body includes a screw mounting to which a grease "barrel"(a tube having one closed end and an open end) containing a quantity of grease or a grease cartridge may be attached to provide a source of grease for the grease gun. When the grease within the cartridge is exhausted, the barrel may be unmounted and a new cartridge inserted and the barrel remounted to the screw mounting of the grease gun body. Grease guns of this type are limited to use with a self contained grease barrel mounted to the grease gun body and carried with it. Such grease guns are useful when the user will need to move around a wide area to lubricate equipment zerks.

Other grease guns are provided with a coupling to a flexible hose connected to a grease supply which may rest on the ground or another surface and need not be carried by the user. Typical of such a grease supply is a container of bulk grease such as a pail or bucket or keg equipped with a hand operated or foot operated pump. As grease is needed in the grease gun body, the user pumps a charge of grease from the grease pail by operating the manual pump, thereby driving a supply of grease into the compression chamber of the grease gun. Existing grease guns of this nature allow for coupling to a grease hose only. This type of grease gun body is useful when the user may remain in a limited area while applying lubricating grease.

Existing hand held portable grease guns provided with removable grease gun barrel are provided with output check valves which resist pressure in the pressure chamber below about 25 psi so that grease under approximately 15 psi in the grease barrel will not discharge through the output nozzle. Resupply of the barrel through the standard resupply port on the grease gun body is limited to low pressure sources so that grease entering grease gun body through the resupply port will not be forced past the output check valve associated with the output nozzle.

A need exists for a versatile grease gun body which may be supplied by a grease barrel mounted on the gun body or by a larger supply of grease carried in a grease pail, barrel or keg and supplied to the grease gun barrel by a hose which may be coupled to the grease gun body.

A further need exists for a versatile grease gun which can be supplied through the standard resupply port at pressures exceeding 25 psi such as through a hose coupled to a grease reservoir pressurized by a foot pump.

The foregoing problems are addressed by the present grease gun invention.

BRIEF SUMMARY OF THE INVENTION

A portable grease gun is provided with the capability of being attached to either a grease containing barrel, or to a hose carrying grease from a grease supply container. The grease gun includes a threaded fitting which will receive a grease barrel which may be recharged through an inlet valve communicative with the interior of the grease barrel, or by replacing a cartridge within the barrel, or by suction from a bulk container. When the grease barrel is removed, an adapter may be substituted for the grease barrel which includes a fitting to which a hose may be mounted. The adapter includes external threads similar to those of the grease barrel, with the external threads receivable in the barrel mounting of the grease gun. The adapter includes a hose fitting which may be mounted opposite the barrel mounting. The hose fitting includes screw threads which will mate with a threaded hose fitting fixed to the end of a suitable hose for conveying grease from a pressurized grease pail, bucket, keg or other grease reservoir.

In an alternate embodiment, a grease gun body is provided with a plug element mounted to the barrel mounting to close the opening. The alternate embodiment grease gun also includes a fitting to couple a grease gun hose to the resupply port located on the grease gun body so that grease from a foot-pumped reservoir may be supplied on an ongoing process to the grease gun.

It is a primary object of the invention to provide a versatile portable grease gun which may be supplied from a self-contained pumped grease reservoir mounted directly to the grease gun or from a supply of bulk grease contained in a reservoir such as a pail, bucket, or keg.

It is also an object of the invention to provide a portable manually operated grease gun which may be used in applications where the grease gun operator is not required to move about a wide area as well as for applications where the user must carry the grease gun to various locations.

It is a further object of the invention to provide a grease gun barrel adapter which may be fitted to the barrel mounting of a grease gun provided with a barrel mount to adapt the grease gun for supplying grease from a bulk source via a duct or hose.

It is still a further object to provide a portable grease gun which can be supplied at the resupply port of the grease gun body through a hose coupled to a pumped reservoir of grease.

It is yet a further objective of the invention to provide a portable grease gun which may be supplied from a pumped grease supply through either the barrel mounting or the alternate fill port of the grease gun.

These and other objects will be understood upon review of the detailed description which follows.

DETAILED DESCRIPTION OF THE INVENTION

Figure 1:
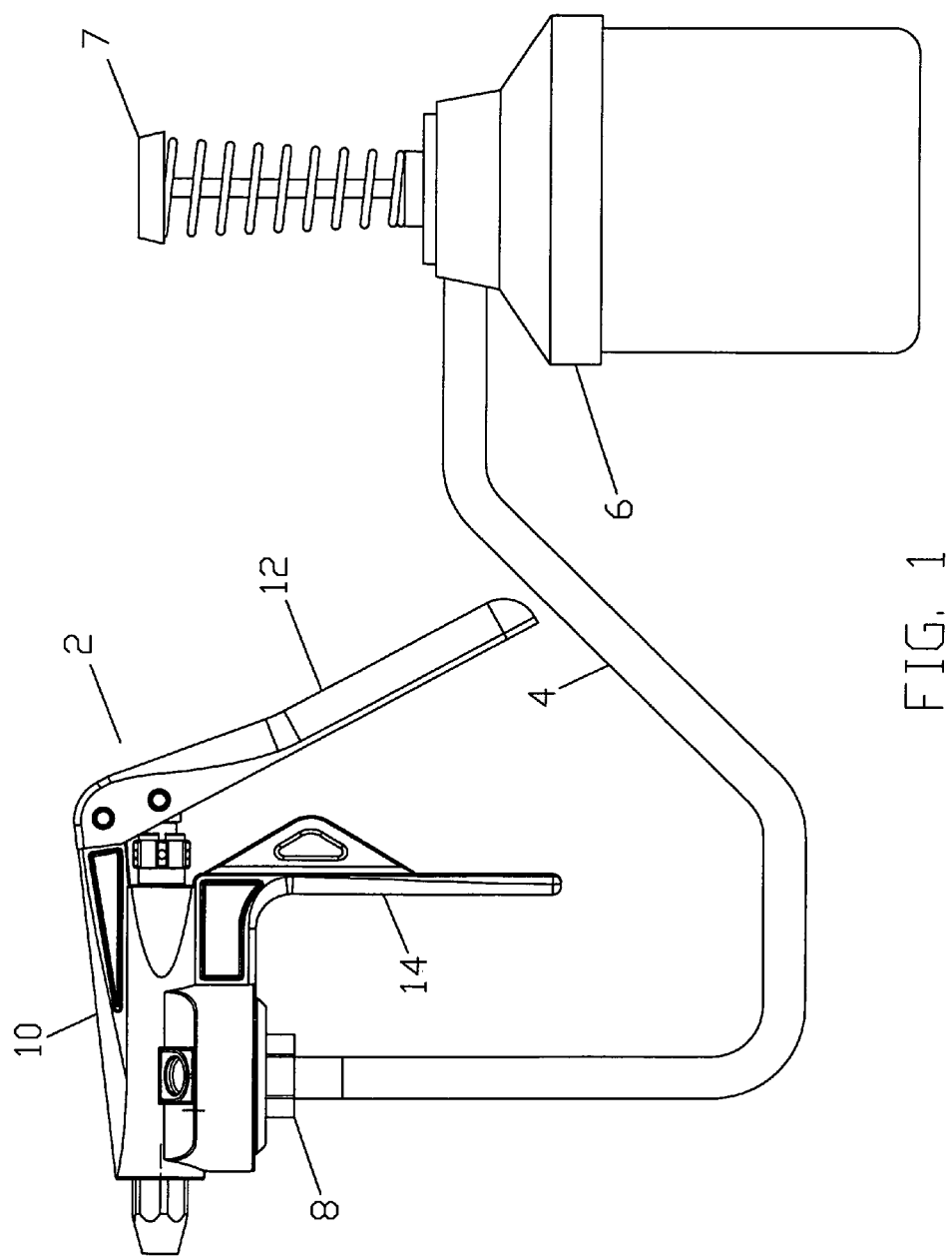
FIG. 1 is a front elevation of a grease gun according to the present invention, coupled by way of a hose to a grease reservoir.

FIG. 1 discloses a grease gun 2 according to the present invention, coupled by a flexible hose 4 to a grease reservoir 6. The hose 4 joins grease gun 2 at adapter 8 which is removeably mounted to grease gun body 10. In this configuration, grease from reservoir 6 may be forced by operation of first pump 7 through hose 4 and through adapter 8 into grease gun body 10. This figure shows actuating lever 12 in its retracted position, rotated away from handle 14.

Figure 2:
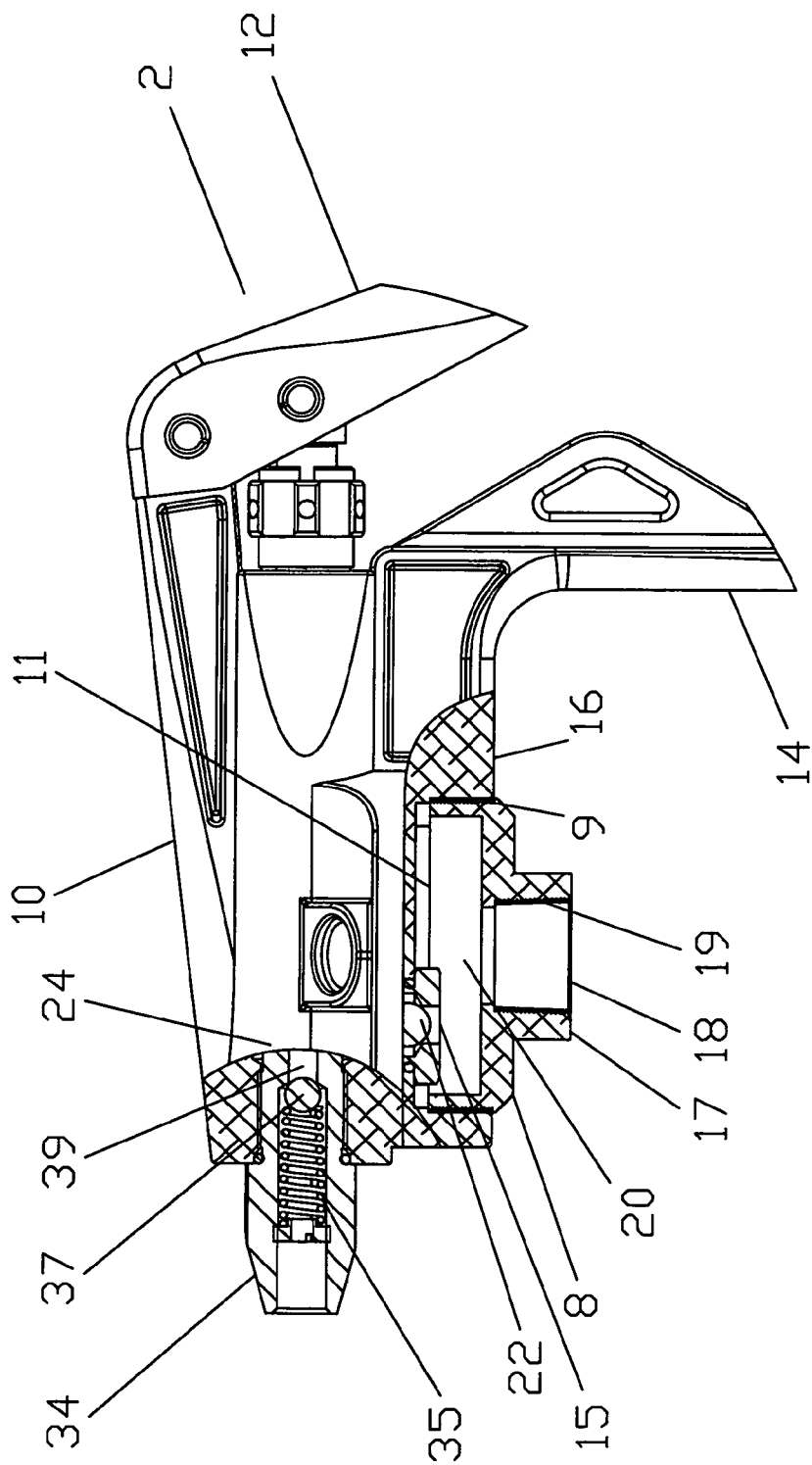
FIG. 2 is a partial section of the grease gun of FIG. 1 with parts of the handle and actuating lever cut away.

Referring now to FIG. 2, a partial cross section of the grease gun 2 shows that adapter 8 is mounted to grease gun body 10 at barrel mounting 16 preferably by screw threads 9. Barrel mounting 16 is configured to receive an end of a grease barrel but when a grease barrel is not mounted, adapter 8 may be screwed into barrel mounting 16. Adapter 8 includes a hose coupling 18 which, as illustrated in FIG. 2, may receive a male coupling of a hose and a swivel connection. Adapter 8 provides a grease compartment 20 in which grease is stored until it is forced past inlet valve 22 into pressure chamber 24 of grease gun body 10. Because adapter 8 is removable from grease gun body 10, a conventional grease barrel may be mounted in its place in barrel mounting 16. It should be understood that though a screw mounting is illustrated for barrel mounting 16, other mechanical attachments such as a bayonet mount could be substituted for the screw mounting shown.

Adapter 8 is preferably cylindrical in shape with an open first end wall 11 which is communicative with the barrel mounting 16 and therefore with inlet port 15 of grease gun body 10. First end wall 11 includes external screw threads for mating with internal screw threads of barrel mounting 16.

Adapter 8 includes second end wall 17 which houses hose coupling 18. Typically second end wall 17 will be smaller than first end wall 11. Second end wall 17 houses hose coupling 18 and is preferably equipped with internal threads 19 to receive a conventional end coupler of a grease hose.

Nozzle body 34 of grease gun body 10 includes an output check valve spring 35 which biases ball 37 to close outlet port 39. Check valve spring 35 is preferably selected to resist movement of ball 37 unless the pressure of grease in outlet port 39 exceeds approximately 150 psi though the pressure resistance of check valve spring 35 may be selected to provide resistance as low as about 30 psi. Increased check valve resistance is desired when grease is supplied to grease gun body 10 through a hose mounted to adapter 8 wherein grease pumped from a grease reservoir may easily exceed the pressure of grease in the conventional grease barrel 26 illustrated in FIG. 3.

Figure 3:
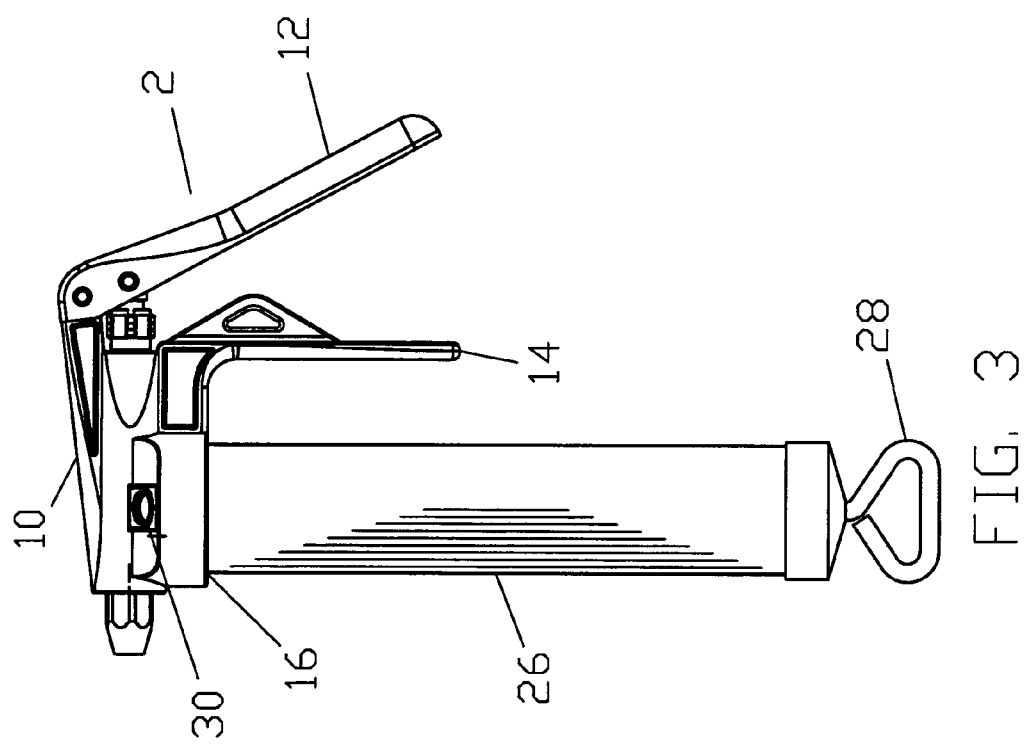
FIG. 3 is a front elevation of the invention grease gun with a grease barrel mounted thereto.

FIG. 3 illustrates the grease gun 2 with a conventional grease barrel 26 mounted to barrel mounting 16 of grease gun body 10. Grease barrel 26 typically may receive a 14.5 oz grease cartridge or it may be filled with bulk grease. As with conventional grease guns, grease within grease barrel 26 is forced into grease gun body 10 by a coil spring biased follower (not shown) contained within grease barrel 26. The pressure of grease in a conventional grease barrel 26 typically does not exceed 16 psi. When the supply of grease in grease barrel 26 is exhausted, grease may be replenished within grease barrel 26 after plunger handle 28 is drawn from grease barrel 26 thereby compressing the coil spring within it. Grease can then be introduced through resupply port 30 (also known as the alternate filler port) mounted on grease gun body 10 which is communicative with the interior of grease barrel 26. Resupply port 30 is capped when not in use.

Figures 4, 5:
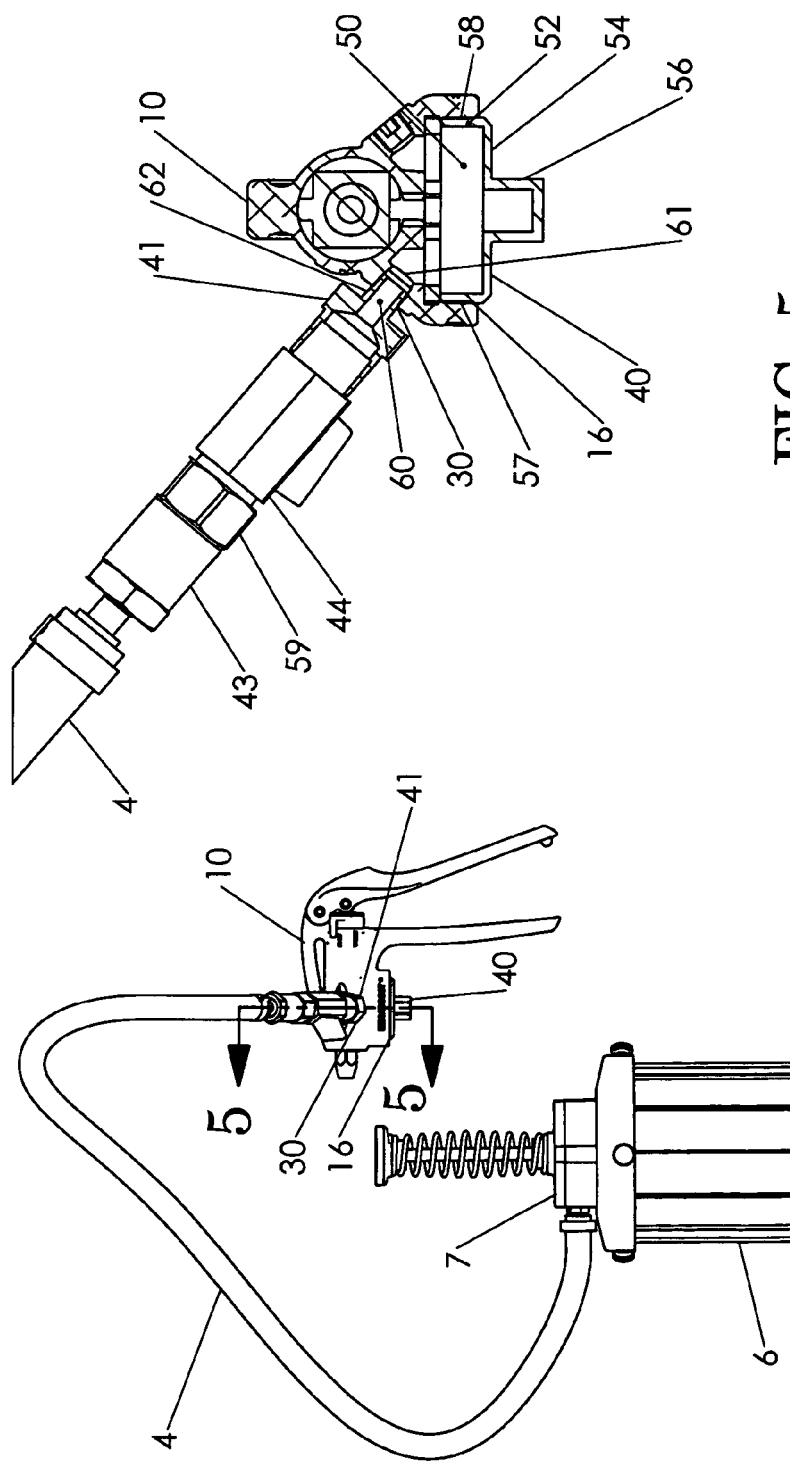
FIG. 4 is an elevation of an alternate grease gun system having a grease reservoir interconnect to a resupply port of a grease gun by a grease supply hose.
FIG. 5 is a partial section view of the grease gun body taken along line 5-5 of FIG. 4.

An alternate embodiment of the invention is disclosed in FIGS. 4 and 5. Grease gun body 10 is provided with plug member 40 which is selectively received in barrel mounting 16. Plug member 40 comprises a cylindrical sidewall 52 and bottom 54 joined thereto which together define hollow 50 therein. A hexagonal body 56 which is integral with bottom 54 depends from plug member 40. Hexagonal body 56 may be grasped by a wrench to tighten plug member 40 within barrel mounting 16. Hollow 50 provides a temporary storage reservoir for grease entering grease gun body 10 through resupply port 30. Preferably, cylindrical sidewall 52 is provided with external threads 58 which are received by internal threads 57 in barrel mounting 16. Therefore, a grease gun body 10 which may be supplied by a conventional grease barrel such as grease barrel 26 of FIG. 3, may be modified by removal of the grease barrel such that plug member 40 may be installed in barrel mounting 16. Plug member 40 completely obstructs passage of grease through barrel mounting 16.

Resupply port 30 is provided in grease gun body 10 and is ordinarily capped when the grease gun body is used conventionally such as when a grease barrel is mounted to grease gun body 10 at barrel mounting 16. When plug member 40 is substituted for grease barrel 26, resupply port 30 is uncapped and it may then be coupled to a remote source of grease. In the invention embodiment as disclosed in FIGS. 4, 5, an adapter fitting 41 may be selectively received in resupply port 30. Grease supply hose 4 may be coupled to resupply port 30 of grease gun body 10 through hose coupler 43 which is joined axially to adapting coupling 59 which is joined in series to manually operated valve 44. Manually operated valve 44 is in turn coupled to adapter fitting 41. Manually operated valve 44 is interposed between hose coupler 43 and adapter 41 so that grease can be prevented from escaping when adapter fitting 41 is disconnected from resupply port 30.

Nipple 62 of adapter fitting 41 is threaded into resupply port 30 which is conventionally provided with internal threads. Grease may be forced though an axial passageway 60 of adapter fitting 41 into resupply port 30 from grease reservoir 6 through hose 4 by action of first pump 7. Grease entering resupply port 30 then may pass along internal passageway 61 of grease body 10 into hollow 50 of plug member 40 from which it can be drawn into the pressure chamber 24 of grease gun body 10.

As with the preferred embodiment of FIGS. 1 through 3, because check valve spring 35 (see FIG. 2) is selected to resist unseating of ball 37 unless pressure in outlet port 39 substantially exceeds at least 25 psi, grease at pressures well in excess of 16 psi may be introduced through resupply port 30 without leakage past output check valve ball 37 of nozzle body 34.

The reason for removing the grease barrel 26 and plugging the barrel mounting 16 when supplying grease from a remote pump supply into the resupply port 30 is that the follower in the grease barrel 26 would not be able to seal against the pressure delivered by the pump 7. There would be leakage around the plunger handle 28 the grease barrel 26.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, we claim:

1. A grease gun for portable use comprising a grease gun body comprising a first mounting adapted for receiving a self contained grease reservoir, the grease gun body further comprising a resupply port communicative with the first mounting, a pumped grease supply coupled to a one of the first mounting and the resupply port, a plug structure obstructing an other of the first mounting and the resupply port, an output check valve coupled to an output port of the grease gun body, the output check valve restraining passage of grease from the output port when the grease is at pressure below about 30 psi, the self contained grease reservoir is an elongate cylindrical grease barrel selectively mounted to the first mounting, the grease gun body and grease barrel when mounted thereto being hand held, the first mounting includes a first intake port, the first intake port communicative with the self contained grease reservoir when the grease reservoir is directly mounted to the first mounting, the plug structure comprises a first plug member selectively mountable to the first mounting, the first plug member obstructing the first intake port when mounted to the first mounting, the plug structure further comprises a second plug member, the second plug member selectively receivable in the resupply port of the grease gun body, the second plug member obstructing the resupply port when received in the resupply port, whereby grease from the pumped grease supply may be introduced into the grease gun through the one of the first mounting and the resupply port.

2. The grease gun for portable use of claim 1 wherein the first plug member comprises a cylindrical sidewall and a bottom, the bottom and the cylindrical sidewall defining a hollow within the first plug member.

3. The grease gun for portable use of claim 2 wherein an adapter fitting is selectively receivable by the resupply port, the adapter fitting including a nipple received within the resupply port, the adapter fitting further including a valve, the valve selectively operable to prevent passage of grease through a duct coupled between the pumped grease supply and the nipple.

* * * * *